Figure 1:
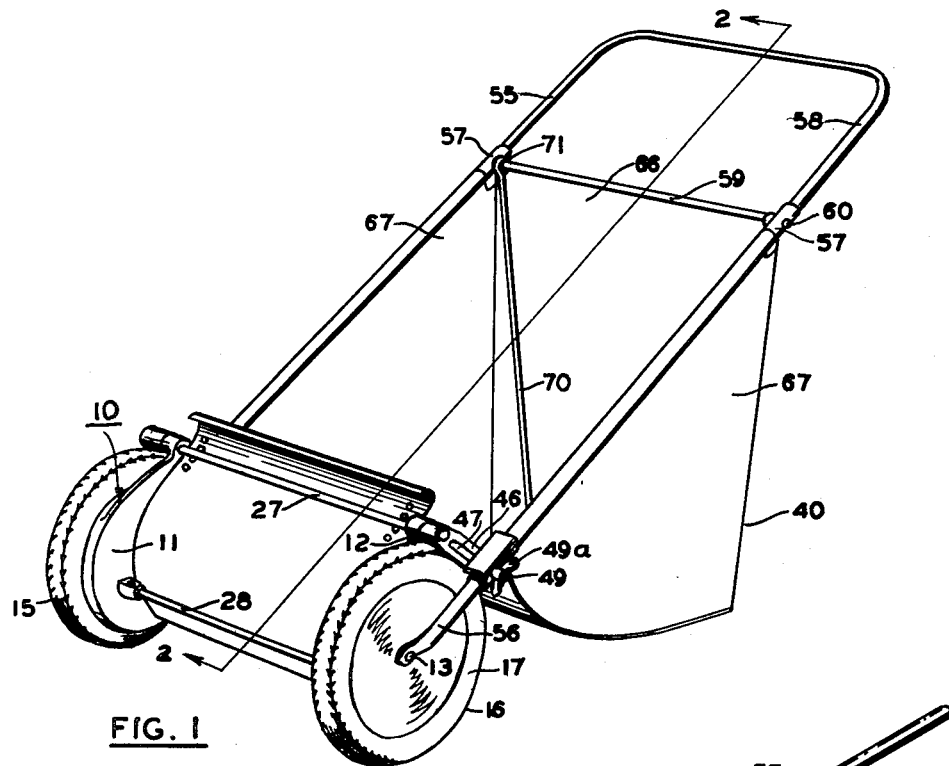

Aug. 31, 1954  E. D. PARKER ET AL  2,687,893
SWEEPER WITH ATTACHED COLLAPSIBLE DEBRIS RECEPTACLE
Original Filed April 14, 1949

INVENTORS:
EDWIN D. PARKER
EARL E. STELZER
BY
THEIR ATTORNEY

Patented Aug. 31, 1954

2,687,893

UNITED STATES PATENT OFFICE 2,687,893

SWEEPER WITH ATTACHED COLLAPSIBLE DEBRIS RECEPTACLE

Edwin D. Parker and Earl E. Stelzer, Springfield, Ohio, assignors to Parker Sweeper Company, Springfield, Ohio, a corporation of Ohio Original application April 14, 1949, Serial No. 87,522. Divided and this application December 21, 1950, Serial No. 201,956

1 Claim. (Cl. 280—36)

The present invention relates to apparatus such as lawn sweepers or lawn mowers in which a receptacle for catching grass clippings or other debris is carried by the handle of the machine, and more particularly to a support for the handle which is also utilized as a means for maintaining a collapsible receptacle in its fully opened position. The present invention is a division of our co-pending application Serial Number 87,522, filed April 14, 1949.

In lawn mowers or lawn sweepers, a handle is provided for manipulating the machine. It is desirable to use a debris receptacle of the collapsible type, since the machine with the collapsible receptacle requires less storage space than one in which the receptacle is not collapsible. One of the objects of the present invention is to provide a rod which not only is utilized for supporting the handle of the machine but is also utilized for maintaining the debris receptacle in an open position. The upper end of this rod is pivotally mounted on the handle and can be swung into and out of engagement with the bottom of the debris receptacle. When the bottom of the rod engages the bottom of the debris receptacle, the receptacle is held in open position and when swung so as not to engage the bottom of the receptacle, the latter can be collapsed.

Further objects and advantages of the present invention will be apparent from the following description, reference being had to the accompanying drawings wherein a preferred form of embodiment of the invention is clearly shown.

Figure 2:
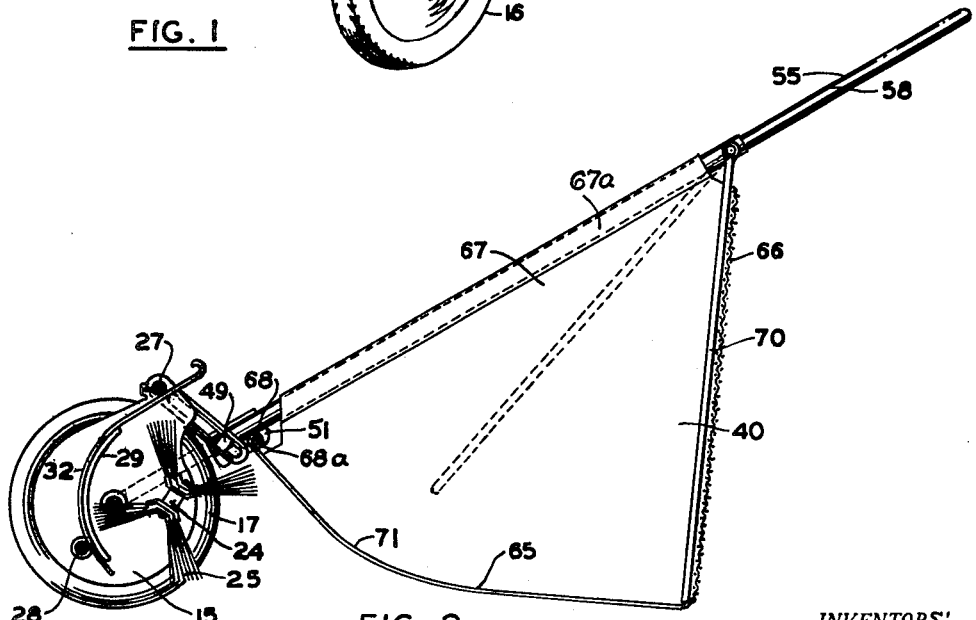

In the drawings:

Fig. 1 is a perspective view of our improved invention, showing the same applied to a lawn sweeper; and Fig. 2 is a view, partly in section and partly in elevation, the section being taken substantially along the line 2—2 of Fig. 1.

Referring more in detail to the drawings, we have chosen to illustrate our present invention in connection with a lawn sweeper which is more clearly shown and described in the aforementioned application Serial Number 87,522, filed April 14, 1949, and in the divisional application Serial Number 201,955, filed on even date herewith.

In the accompanying drawing, the sweeper shown includes a main frame indicated generally at 10 including axle means and side plates 11 and 12 which are tied with one another through tie rods 27 and 28. The main frame is carried by wheels 15 and 16 encased in rubber tires 17. These wheels drive a brush reel 24 for brushes 25. A hood 32 is suitably carried by the frame 10 and extends forwardly and above the forepart of the brushes 25.

A handle is generally indicated at 55. This handle is generally inverted U-shaped and the lower ends 56 thereof are pivotally carried by the frame, on axles 13. Brackets 46 are carried by the ends of rod 27. These brackets are provided with longitudinal slots 47 and the handle 55 is connected intermediate its ends to the bracket 46 by bolts 49 and wing nuts 49a which bolts are adjustably connected with the brackets 46 through the slot 47. The bolts 49 also hold brackets 51 in position on the handle 55.

A debris receptacle 40 includes a thin resilient sheet metal bottom 65 which is rolled at the forward end as at 68a to receive a rod 68. This rod extends through the roll 68a and the ends thereof are carried by the brackets 51. The debris receptacle also includes a canvas back 66 and canvas side walls 67,. The upper ends of the side walls 67 are provided with hems 67a which receive the legs of the handle 55.

Preferably the handle includes two lower sections 56, an upper U-shaped section 58 and intermediate sections 57. These sections are each formed of tubular material arranged in telescoping relationship, that is, the lower ends of sections 57 receive the upper ends of sections 56 and the upper ends of sections 57 to receive the lower ends of sections 58. Sections 56 and 57 are held together by the bolts 49 which pass through aligned holes in said sections. Aligned holes are formed in the upper ends of sections 57 and the lower ends of section 58 to receive screws 60. These screws are threaded into the ends of a cross rod 59, threaded to receive these screws.

A U-shaped rod 70 is utilized for supporting the handle and for holding the collapsible debris receptacle 40 in fully opened position. The upper ends of the rod 70 are provided with loops 71 which freely receive the rod 59 whereby the rod 70 is pivotally mounted upon the rod 59. The lower end or yoke of the rod 70 is arranged to engage the rear of the bottom 65 of the receptacle and is preferably disposed inside the receptacle. When the bottom end of the rod 70 is forced rearwardly as far as possible, as shown in Fig. 2, the debris receptacle will be held in the position shown in Fig. 2. The resilient metal wall 65 will assume the position shown in Fig. 2 because of the configuration of the canvas of the side walls 67. The upwardly sloping curve indicated generally at 71 provides for sliding of the debris rearwardly in the receptacle.

Thus the rod 70 provides a rear support for the handle 55. When it is desirable to store the machine, the bottom end of the rod 70 is swung forwardly, permitting the collapsing of the collapsible receptacle 40. The rear end of the bottom wall 65 and consequently the entire bottom wall can be swung into engagement with the handle 55.

While the form of mechanism herein shown and described constitutes a preferred form, it is to be understood that other forms might be adopted, all coming within the scope of the claim which follows.

We claim:

In a lawn sweeper or the like, in combination, a main frame including axle means; wheels for the main frame; an inverted U-shaped handle having the lower ends thereof connected with the frame; a rod spaced intermediate the top and bottom of the handle and connected with the legs of the handle; a collapsible debris receptacle having a metal bottom and flexible side and back walls, said bottom having the front end thereof pivotally connected with the handle, the upper edges of said side walls being directly carried by the handle; a U-shaped rod having the upper ends thereof pivotally connected with the first mentioned rod and the yoke thereof extending within the receptacle and engaging the rear end of the bottom of the receptacle.

References Cited in the file of this patent

UNITED STATES PATENTS

| Number | Name | Date |
|---|---|---|
| 241,765 | Wever | May 17, 1881 |
| 824,717 | Hann | July 3, 1906 |
| 1,148,761 | Day | Aug. 3, 1915 |
| 1,486,758 | Jerram | Mar. 11, 1924 |
| 1,718,962 | Kimball | July 2, 1929 |
| 2,091,077 | Limbach | Aug. 24, 1937 |
| 2,399,359 | Kroll et al. | Apr. 30, 1946 |